United States Patent
Sun et al.

(10) Patent No.: US 10,782,669 B2
(45) Date of Patent: Sep. 22, 2020

(54) MACHINING PARAMETER ADJUSTMENT SYSTEM AND MACHINING PARAMETER ADJUSTMENT METHOD

(71) Applicant: INDUSTRIAL TECHNOLOGY RESEARCH INSTITUTE, Hsinchu (TW)

(72) Inventors: Jia-Cheng Sun, Tianzhong Township (TW); Chen-Hui Kuo, Taichung (TW); Chi-Cheng Lin, Taichung (TW); Chen-Yu Kai, Pingtung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/225,876

(22) Filed: Dec. 19, 2018

(65) Prior Publication Data
US 2020/0174442 A1    Jun. 4, 2020

(30) Foreign Application Priority Data
Nov. 30, 2018 (TW) .............. 107142838 A (51) Int. Cl.
*G05B 19/401* (2006.01)
*G05B 19/18* (2006.01)
*G05B 19/4097* (2006.01)

(52) U.S. Cl.
CPC ......... *G05B 19/401* (2013.01); *G05B 19/182* (2013.01); *G05B 19/4097* (2013.01);
(Continued)

(58) Field of Classification Search
CPC ............... G05B 19/401; G05B 19/182; G05B 2219/37087; G05B 2219/42152; G05B 21/4097; G05B 2219/41077
See application file for complete search history.

(56) References Cited

U.S. PATENT DOCUMENTS

| 4,472,770 A | * | 9/1984 | Li | ............ G06Q 10/04 700/29 |
| 5,285,378 A | | 2/1994 | Matsumoto | |

(Continued)

FOREIGN PATENT DOCUMENTS

| CN | 101231517 B | 6/2011 |
| CN | 104570940 A | 4/2015 |

(Continued)

OTHER PUBLICATIONS

Feng et al., "Control parameters auto-tuning for bi-axial servo feed system", Elsevier, Procedia CIRP, vol. 17, 2014, pp. 841-846.
(Continued)

*Primary Examiner* — Ronald D Hartman, Jr.
(74) *Attorney, Agent, or Firm* — Birch, Stewart, Kolasch & Birch, LLP (57) ABSTRACT

A machining parameter adjustment system is established in a controller. The controller is connected to a machine. The controller is configured to receive a machining program and analyze at least one process included in the machining program. Also, the controller sets a tuning program corresponding to the process and inserts the tuning program before or after the code of the process, so as to generate an integration program and upload the integration program to the machine.

10 Claims, 6 Drawing Sheets

(52) U.S. Cl.
CPC .............. *G05B 2219/37087* (2013.01); *G05B 2219/41077* (2013.01); *G05B 2219/42152* (2013.01)

(56) References Cited

U.S. PATENT DOCUMENTS

| | | | | |
|---|---|---|---|---|
| 5,933,353 | A * | 8/1999 | Abriam | G05B 19/4097 700/171 |
| 6,198,246 | B1 | 3/2001 | Yutkowitz | |
| 6,401,004 | B1 * | 6/2002 | Yamazaki | G05B 19/40937 700/159 |
| 6,502,007 | B1 * | 12/2002 | Kanamoto | G05B 19/40937 700/173 |
| 6,671,571 | B1 * | 12/2003 | Matsumiya | G05B 19/401 700/172 |
| 6,806,674 | B2 | 10/2004 | Iwashita et al. | |
| 6,942,436 | B2 * | 9/2005 | Kakino | G05B 19/40937 409/80 |
| 8,005,567 | B2 * | 8/2011 | Porter | G05B 19/4097 700/182 |
| 8,364,305 | B2 | 1/2013 | Hsu et al. | |
| 9,501,053 | B2 | 11/2016 | Wu et al. | |
| 2001/0012972 | A1 * | 8/2001 | Matsumoto | G05B 19/4166 700/160 |
| 2003/0023341 | A1 * | 1/2003 | Sagawa | G05B 19/4093 700/159 |
| 2003/0045964 | A1 * | 3/2003 | Lottgen | G05B 19/409 700/180 |
| 2003/0045965 | A1 * | 3/2003 | Sinn | G05B 19/4097 700/182 |
| 2003/0079214 | A1 * | 4/2003 | Ghobrial | G06F 8/443 717/158 |
| 2004/0236462 | A1 * | 11/2004 | Takeshita | G05B 19/4103 700/173 |
| 2006/0277529 | A1 * | 12/2006 | Michimoto | G06F 8/433 717/136 |
| 2014/0163720 | A1 | 6/2014 | Nelaturi et al. | |
| 2015/0227351 | A1 * | 8/2015 | Wuerthinger | G06F 8/443 717/139 |
| 2016/0026167 | A1 * | 1/2016 | Yamada | G05B 19/41865 700/174 |
| 2017/0060116 | A1 * | 3/2017 | Liao | G05B 19/402 |

FOREIGN PATENT DOCUMENTS

| | | |
|---|---|---|
| TW | 20042287 A | 11/2004 |
| TW | 201021960 A1 | 6/2010 |
| TW | I510874 B | 6/2011 |
| TW | I448357 B | 8/2014 |

OTHER PUBLICATIONS

Hidalgo et al., "A Frequency Domain Approach for Tuning Control Parameters of CNC Servomotors to Enhance its Circular Contouring Accuracy", Elsevier, Procedia CIRP, vol. 63, 2017, pp. 372-377.

Hsu et al., "Applications of Self-Tuning Control on Industrial CNC Machines", Int. J. Mach. Tools Manufact., vol. 34, No. 6, 1994, pp. 859-877.

Wang et al., "An Adaptive Parameter Tuning Method with On-machine Weight Identification Function for CNC Machine Tools", Applied Mechanics and Materials, vols. 479-480, Dec. 6, 2013, pp. 268-273.

Zhao et al., "Automated process parameters tuning for an injection moulding machine with soft computing", Journal of Zhejiang University—Science A: Applied Physics & Engineering, vol. 12, No. 3, Mar. 2011, pp. 201-206.

Zuperl et al., "Intelligent Adaptive Cutting Force Control in End-Milling", Tehnički Vjesnik, vol. 13, 2006, pp. 15-22.

Taiwanese Office Action and Search Report dated Aug. 16, 2019, for corresponding Taiwanese Application No. 107142838.

* cited by examiner

| O0001 control parameter file | ~TL

MACHINING PARAMETER ADJUSTMENT SYSTEM AND MACHINING PARAMETER ADJUSTMENT METHOD

CROSS-REFERENCE TO RELATED APPLICATION

The present application is based on, and claims priority from, Taiwan Application Serial Number 107142838, filed Nov. 30, 2018, the disclosure of which is hereby incorporated by reference herein.

TECHNICAL FIELD

The present disclosure relates to a parameter adjust system and a parameter adjust method, and in particular it relates to a machining parameter adjustment system and a machining parameter adjustment method suitable for a machine tool.

BACKGROUND

In the processing of a computer numerical control (CNC) machine tool, a computer numerical control machine tool generally cuts materials according to preset machining parameters. More specifically, the controller of the computer numerical control machine tool drives the motor of the computer numerical control machine tool to operate according to the machining parameters, and the machining parameters affect processing factors such as acceleration, precision, and surface smoothness of the computer numerical control tool machine.

The machining parameters of the traditional computer numerical control machine tool are already set before leaving the factory. It is processed by the same set of machining parameters during processing. However, there are often different requirements on the production line. For example, some processes require that precision be the priority, other speed, and still others smoothness. The traditional computer numerical control machine tool can't change machining parameters at will, so the production line has no flexibility.

Therefore, how to provide a machining parameter adjustment system and a machining parameter adjustment method has become one of the challenges to be solved in the field.

SUMMARY

The present disclosure provides a machining parameter adjustment system. The machining parameter adjustment system is established in a controller. The controller is connected to a machine. The controller is configured to receive a machining program and analyze at least one process included in the machining program. Also, the controller sets a tuning program corresponding to the process and inserts the tuning program before or after the code of the process, so as to generate an integration program and upload the integration program to the machine.

The present disclosure provides a machining parameter adjustment method. The machining parameter adjustment method is established in a controller. The machining parameter adjustment method comprises: receiving a machining program and analyzing at least one process included in the machining program; setting a tuning program corresponding to the process; inserting the tuning program before or after the code of the process, so as to generate an integration program; and uploading the integration program to a machine.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
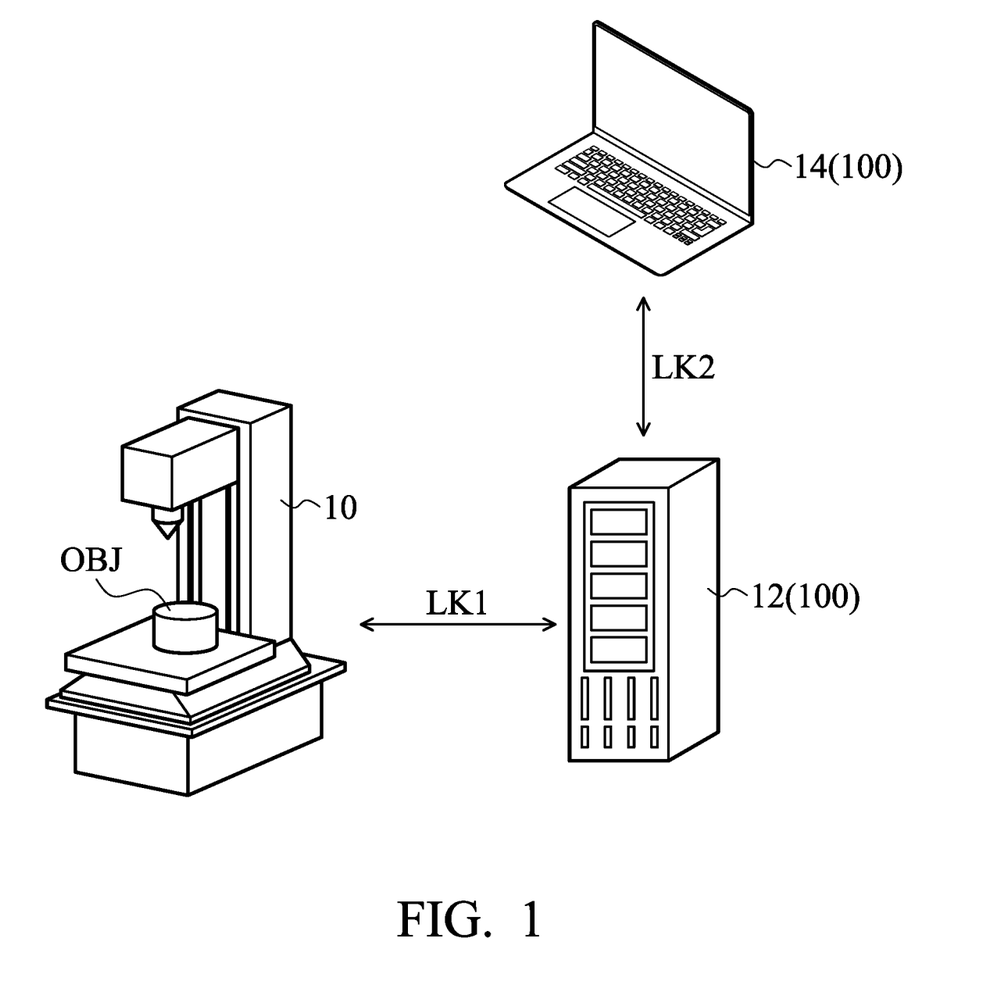
FIG. 1 is a block diagram of a machining parameter adjustment system in accordance with one embodiment of the present disclosure.

Please refer to FIG. 1, FIG. 1 is a block diagram of a machining parameter adjustment system 100 in accordance with one embodiment of the present disclosure. The machining parameter adjustment system 100 is implemented in a controller 12. The machine 10 usually establishes a communication link LK1 with the controller 12 in a wired manner. In one embodiment, the controller 12 can be mounted on the machine 10. In another embodiment, the controller 12 is disposed outside the machine 10.

In one embodiment, the controller 12 can be implemented by using an integrated circuit, such as a microcontroller, a microprocessor, a digital signal processor, an application specific integrated circuit (ASIC), or a logic circuit.

In one embodiment, the machine 10 can be a computer numerical control (CNC) machine tool or other equipment for machining. In one embodiment, the machine 10 is used to make (for example, cut) an object OBJ.

In one embodiment, the controller 12 can establish a communication link LK2 with an electronic device 14 by wire/wireless mode. The machining parameter adjustment system 100 can be established in the electronic device 14 to instead the controller 12. Also, the controller 12 is turned to be a conversion device between the electronic device 14 and the machine 10. The electronic device 14 can be a desktop computer, a notebook computer, a tablet computer or other device having processing functions and storing functions.

In an embodiment, the machining parameter adjustment method includes a path analysis method, an automatic tuning method, and/or a program integration method. The detailed technical features of such methods are described below.

Figure 2A:
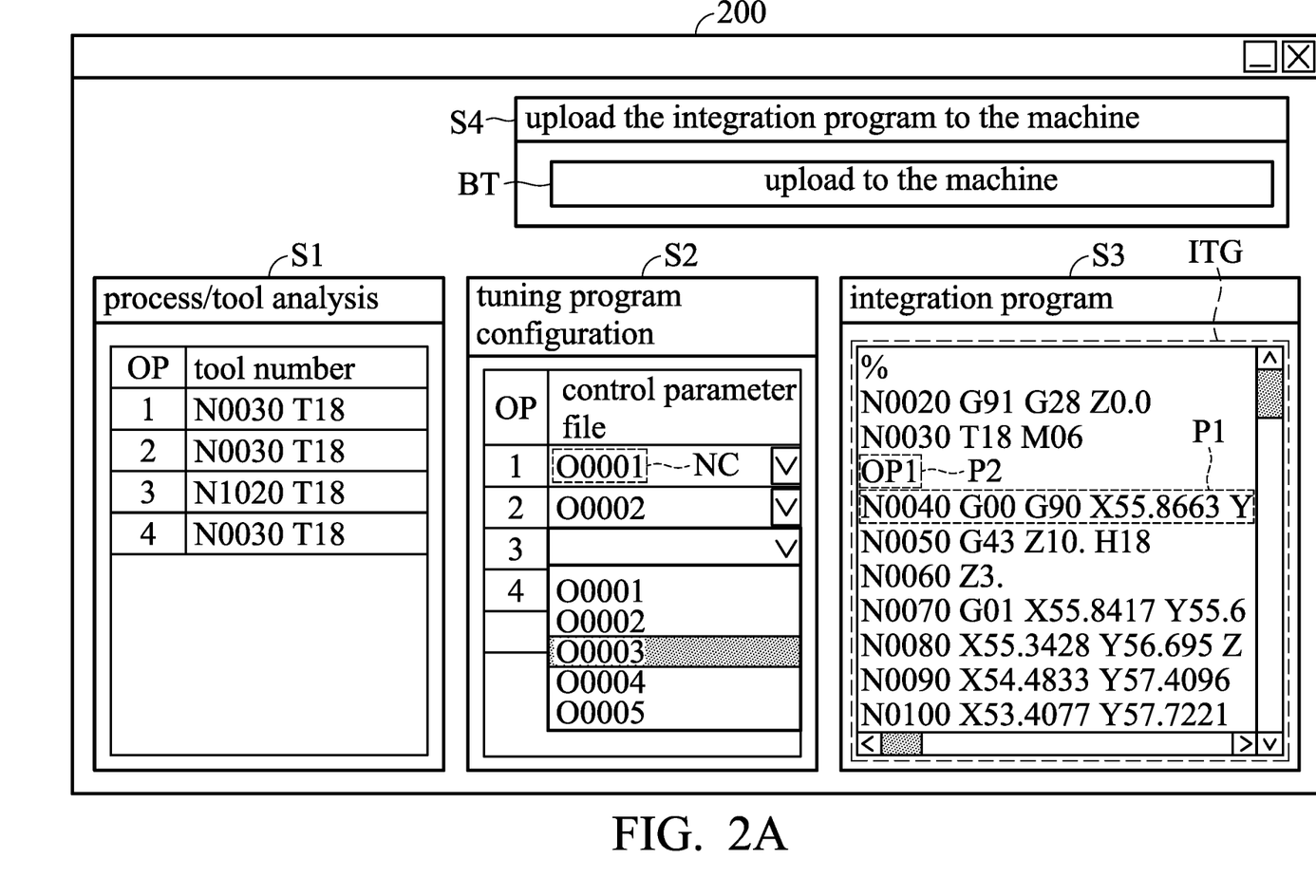
FIGS. 2A-2B are schematic diagrams of a user interface of a program integration method of the machining parameter adjustment method in accordance with another embodiment of the present disclosure.
Figure 2B:
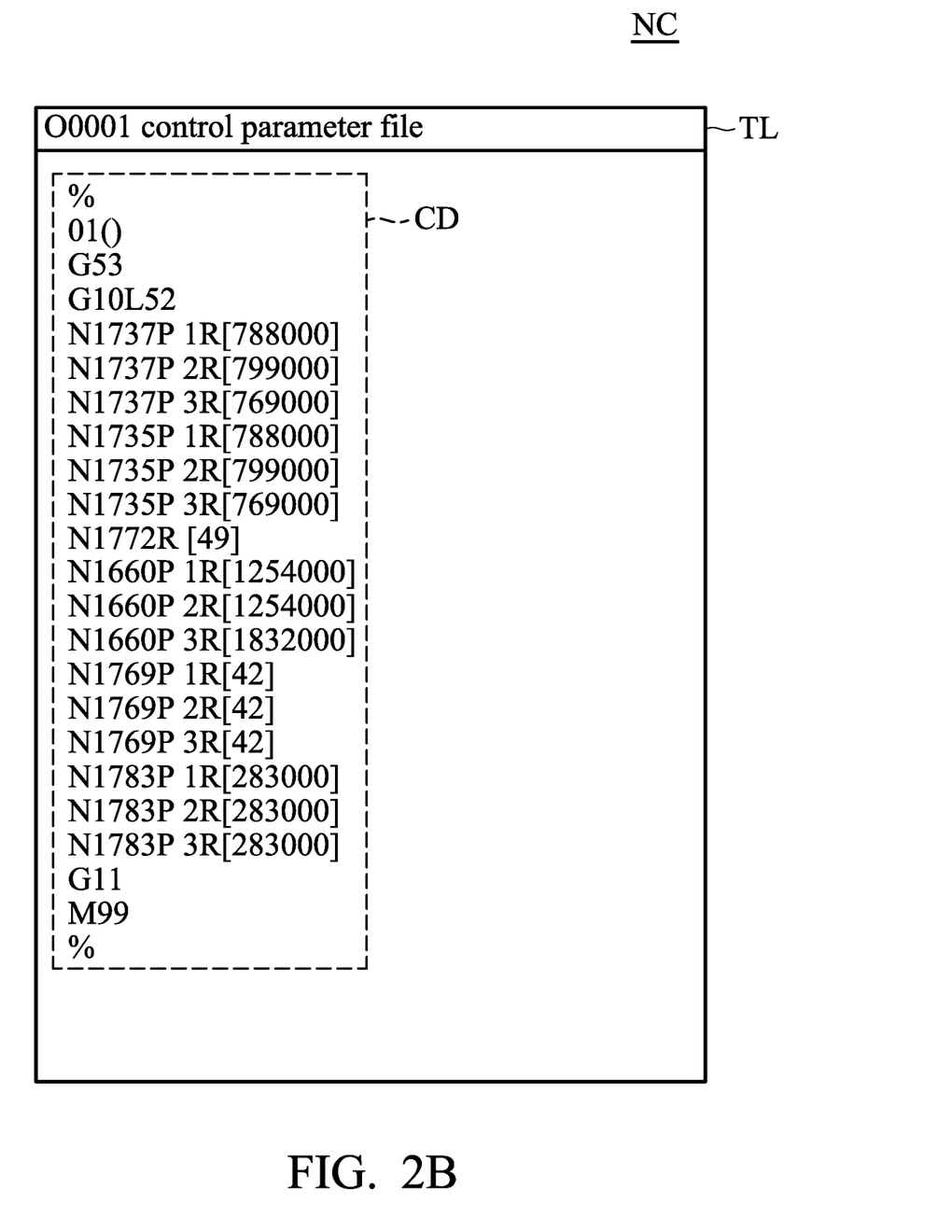
Figure 3:
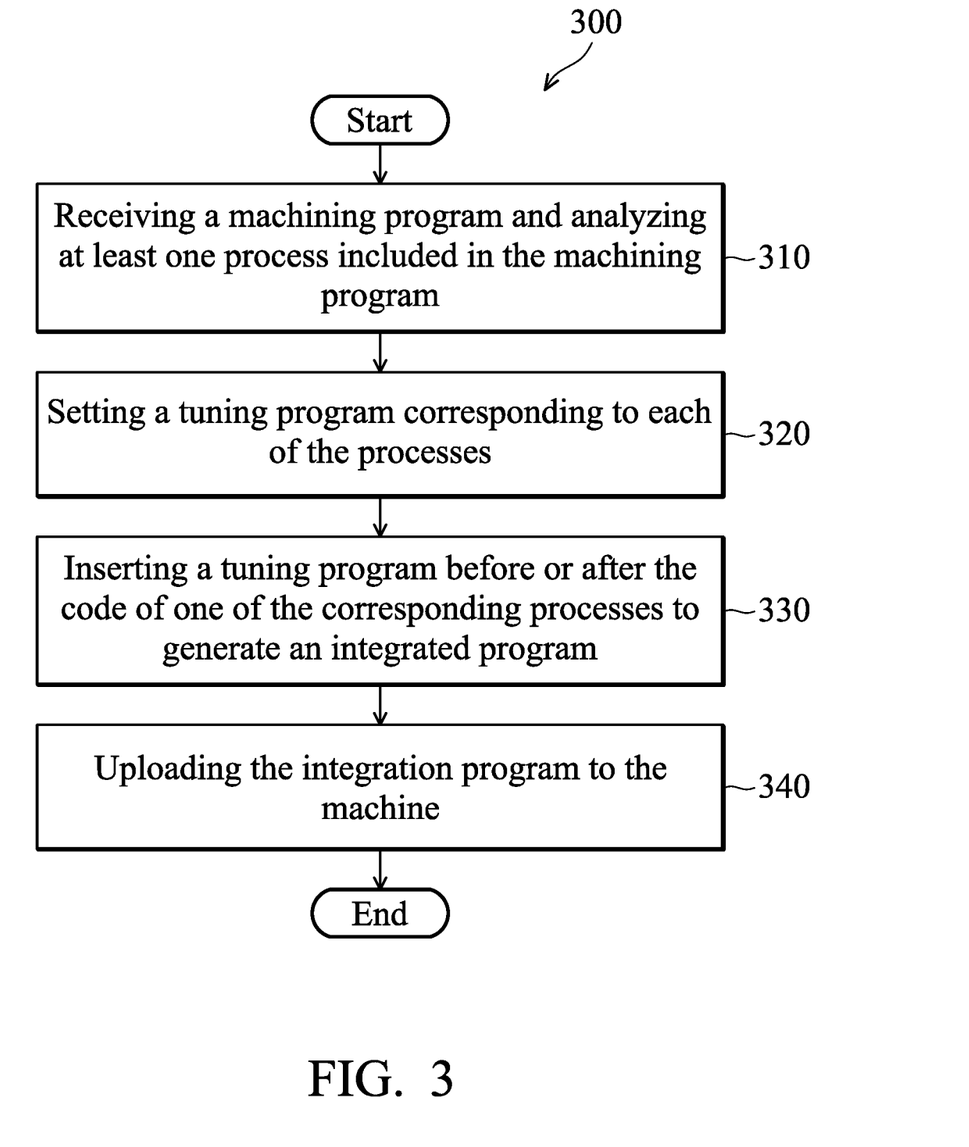
FIG. 3 is a flowchart of a program integration method of the machining parameter adjustment method in accordance with one embodiment of the present disclosure.

In one embodiment, please refer to the FIGS. 1, 2A, 2B, and 3. FIGS. 2A-2B are schematic diagrams of a user interface 200 of a program integration method of the machining parameter adjustment method in accordance with another embodiment of the present disclosure. FIG. 3 is a flowchart of a program integration method 300 of the machining parameter adjustment method in accordance with one embodiment of the present disclosure.

In step 310, the controller 12 receives a machining program. Also, the machining parameter adjustment system 100 established in the controller 12 analyzes at least one process OP including in the machining program.

In one embodiment, the controller 12 obtains the machining program from computer-aided manufacturing (CAM) software. In one embodiment, the production method using computer-controlled machinery is called computer aided manufacturing. Computer aided manufacturing is closely related to computer-aided design (CAD), because the product data outputted by computer-aided design can be used to assist editing the production programs. And then, the production programs can be tested and produced immediately. Thus, the processes from product design to manufacturing can be simplified by using computer-aided manufacturing and computer-aided design.

In one embodiment, when the machine 10 makes a product, for example, in the process of making a cylinder (e.g., an object OBJ), the machine 10 firstly performs a roughing process to initially remove some materials, and then performs a semi-finishing process to make the initial shape of the cylinder. Also, finally the finishing process is performed to make the surface of the cylinder fine. The process sequences of the three are written in the machining program. When the controller 12 of the built-in machining parameter adjustment system 100 (the controller 12 described below) obtains the machining program by its own storage device or by other electronic devices, the controller 12 will disassemble the machining program to obtain the corresponding information about each process OP. For example, as shown in block S1 of FIG. 2A, the controller 12 analyzes a plurality of processes OP included in the machining program, and each process OP corresponds to one tool number. For convenience of explanation, the process in which the process column content in the block S1 recorded as 1 is referred to as the process OP1, the process column content recorded as 2 is referred to as the process OP2, the process column content recorded as 3 is the process OP3, and the process column content recorded as 4 is the process OP4.

In step 320, the controller 12 sets a tuning program corresponding to each of the processes OP. For example, as shown in block S2 of FIG. 2A, the process OP1 corresponds to the control parameter file NC numbered O0001.

In one embodiment, the control parameter file NC contains the code CD of the tuning program P2. In one embodiment, the code CD includes execution instructions and parameters such as accuracy, surface roughness, velocity target, automatic optimization motion control, server control, etc.

In one embodiment, the content of the control parameter file NC numbered O0001 can be, for example, as shown in FIG. 2B. Also, the control parameter file NC numbered O0001 can be edited by a notepad. In this example, the control parameter File O0001 contains the title column TL and the code CD of the tuning program P2. In other words, the process OP1 corresponds to the control parameter file NC numbered O0001, and the controller 12 can read or execute the code CD of the tuning program P2 corresponding to the process OP1 through the control parameter file NC.

In one embodiment, processes OP1-0P4 can automatically or manually select the control parameter file. For example, as shown in FIG. 2B, the control parameter file column of the process OP3 can be clicked to expand a drop-down menu to select the control parameter file corresponding to the process OP3 (for example, selecting the control parameter file O0003).

In one embodiment, the tuning program can be regarded as a subroutine (or sub-program) of the machining program. However, the person skilled in the art should understand that the implementation of the present invention with respect to the tuning program is not limited thereto.

In step 330, the controller 12 inserts a tuning program (for example, the tuning program P2) before or after the code (for example, the code P1) of one of the corresponding processes (for example, the process OP1) to generate an integrated program or an integration program (for example, integration program ITG).

For example, the controller 12 sequentially reads the code shown in the integration program block S3. When the controller 12 reads a specific code P1 of the process OP1 (the process OP1 represents, for example, a finishing process, the code P1 is, for example, a start execution instruction of process OP1), the controller 12 inserts the tuning program P2 corresponding to the process OP1 before the code P1 of the process P1, which means that the tuning program P2 (for example, execution roughing processes) is executed before the finishing process OP1.

More specifically, in this example, the content of the tuning program P2 is "OP1", which corresponds to the process OP1 in the block S2, and the block OP2 knows that the process OP1 corresponds to the number O0001 of the control parameter file NC. Therefore, the controller 12 can read or execute the code CD of the tuning program P2 corresponding to the process OP1 through the control parameter file NC.

Therefore, when the controller 12 reads a specific process (for example, the process OP1), the code of the tuning program (for example, the tuning program P2) corresponding to the process can be automatically inserted before or after the process (for example, the code CD).

As such, by inserting a tuning program (which can be regarded as a subroutine or sub-program), the machining program (considered as a main program) can be tuned to meet specific process considerations.

In one embodiment, the code CD of the tuning program (for example, the tuning program P2) can be written with or separately from the programming code of the other programming program (for example, the control parameter file NC), without inserting into the machining program. When the controller 12 reads a specific code (for example, the code P1) of a specific process (for example, the process OP1), the process OP1 is not executed, and the code CD of the tuning program P2 in the control parameter file NC is directly executed. In this way, before the process OP1 is entered, the tuning program P2 is executed to perform the tuning process. After the tuning program P2 is executed, the execution step is returned to the machining program OP1. In this example, it is not necessary to automatically insert the tuning program P2 into the machining program, thereby not changing the original machining program.

In one embodiment, after the machining program is inserted into the tuning program, it is called the integration program ITG.

In step 340, the controller 12 uploads the integration program ITG to the machine 10. In one embodiment, the integration program ITG is automatically uploaded to the machine 10, or uploaded to the machine 10 through the user clicking the button BT in the block S4.

In one embodiment, the integrated program ITG is used to control the motor in the machine 10 to perform cutting operations by a tool.

Figure 4:
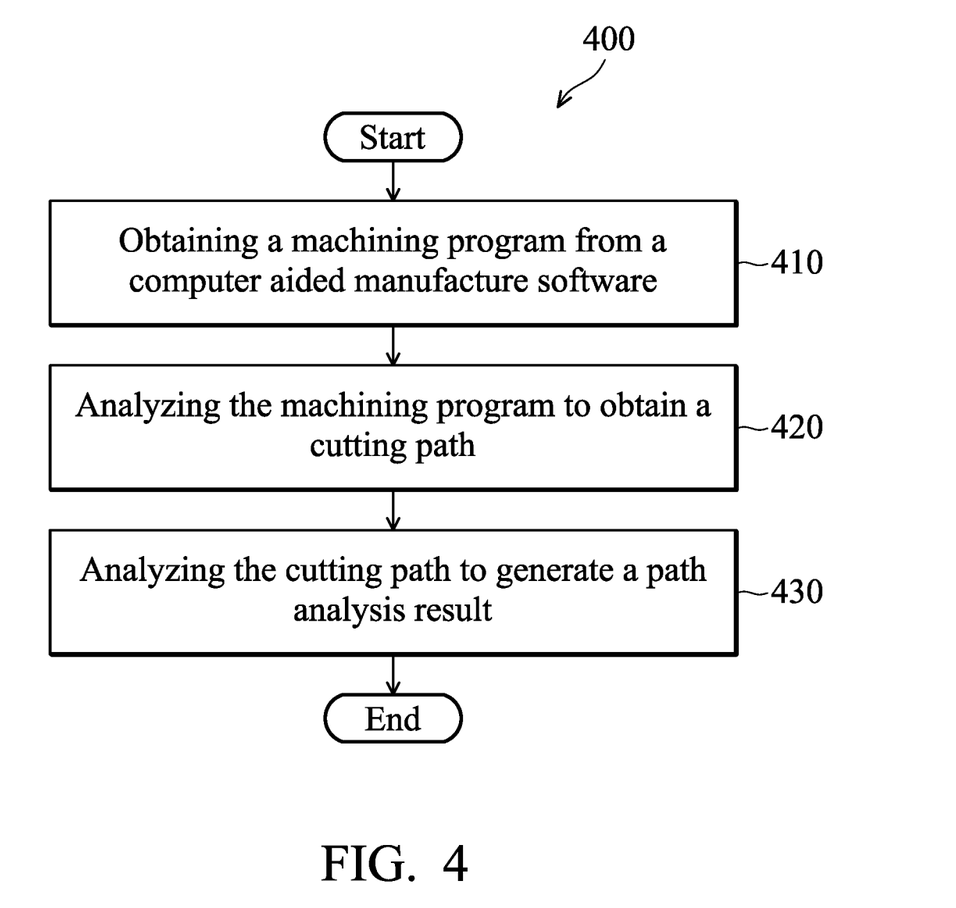
FIG. 4 is a flowchart of a path analysis method of a machining parameter adjustment method in accordance with one embodiment of the present disclosure.

In one embodiment, FIG. 4 is a flowchart of a path analysis method 400 of a machining parameter adjustment method in accordance with one embodiment of the present disclosure.

In step 410, the controller 12 obtains a machining program from computer-aided manufacturing software.

In step 420, the controller 12 analyses the machining program to obtain a cutting path. In one embodiment, the controller 12 analyses the cutting path to obtain parting allowance information. In one embodiment, the parting allowance information can be the amount of deviation that the semi-finished product retains from the target object OBJ after cutting the workpiece in a certain process. For example, when the machining reserve is large, the rigidity of the machining system is poor, or the power of the machine 10 is insufficient, the feed can be divided into multiple feeds. For example, after the roughing process, a remaining amount of 0.5 mm to 1.0 mm is left, and it is removed in the semi-finishing process.

In step 430, the controller 12 analyses the cutting path to generate a path analysis result. By the path analysis result (including the lower tool path, coordinate information, cutting depth), the falling point of the knife can be finely adjusted to make the cutting depth equal to the machining allowance of the workpiece as much as possible, thus reducing the number of passes and improving production efficiency.

Figure 5:
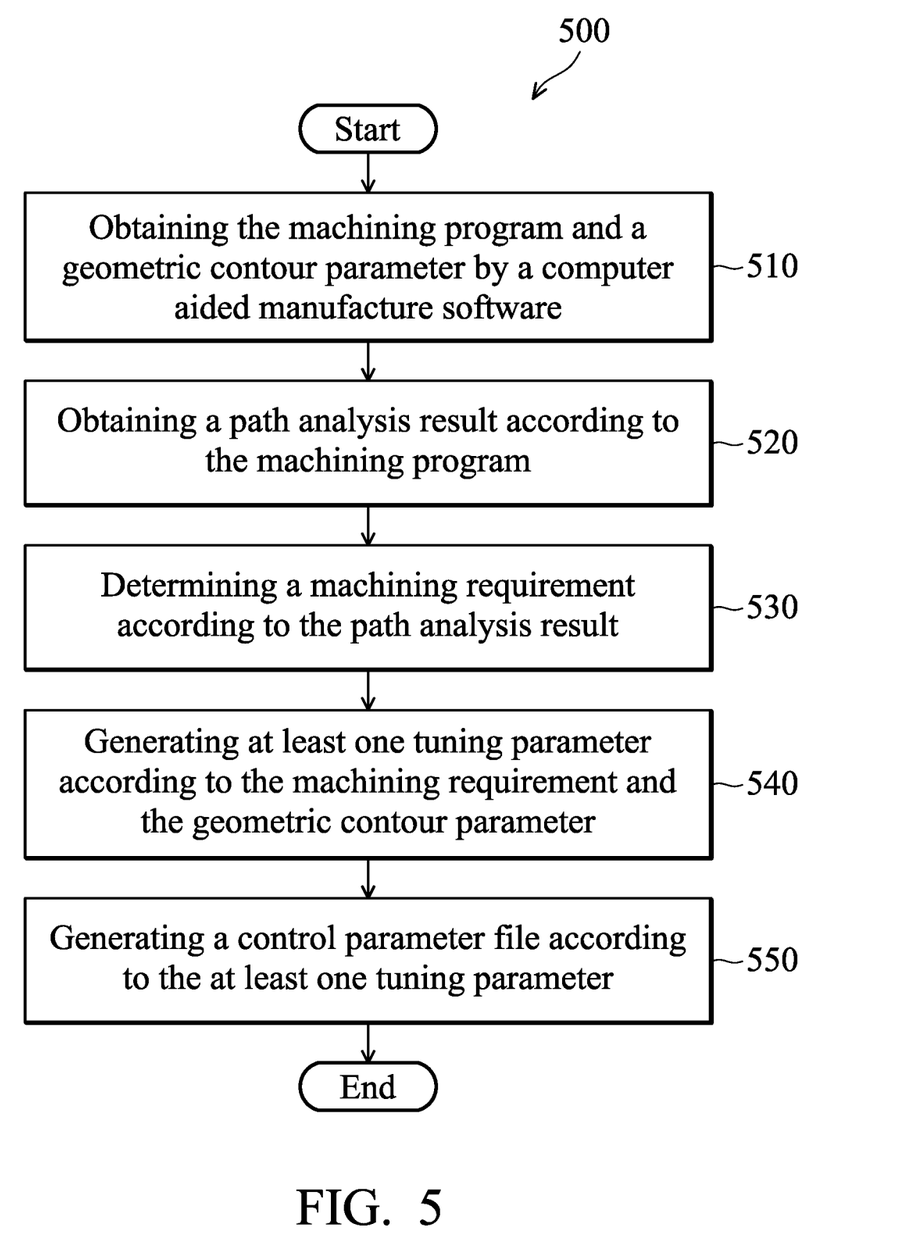
FIG. 5 is a flowchart of an automatic tuning method of a machining parameter adjustment method in accordance with one embodiment of the present disclosure.

In one embodiment, FIG. 5 is a flowchart of an automatic tuning method 500 of a machining parameter adjustment method in accordance with one embodiment of the present disclosure.

In step 510, the controller 12 obtains the machining program and a geometric contour parameter from computer-aided manufacturing software. In one embodiment, the controller 12 can obtain the sequence of executing the process from the machining program, and the tolerance value can be known from the geometric profile parameter. In one embodiment, when the machine 10 performs machining, the machine 10 is affected by machine performance, material, tool wear, temperature change, operation method and technology. Also, it is difficult to process workpieces of uniform size, and the cost of the interchangeability and reduction of the parts are considered. Without affecting the assembly function, the workpiece size is allowed to have a certain range of deviation. The amount of deviation is called tolerance.

In one embodiment, the controller 12 can determine the range of tuning parameters by looking up a table or calculating (e.g., a scaling) based on tolerances.

In step 520, the controller 12 obtains a path analysis result according to the machining program. In one embodiment, the path analysis result includes tool path, coordinate information, cutting depth, motion path, planned motion acceleration and deceleration, path interpolation, and position pulse command, etc. In one embodiment, controller 12 can generate a torque command to drive the motor according to the position pulse command.

In step 530, the controller 12 determines a machining requirement according to the path analysis result. In one embodiment, the machining requirement includes acceleration priority, accuracy priority, and/or surface smoothness priority.

In step 540, the controller 12 generates at least one tuning parameter according to the machining requirement and the geometric contour parameter.

In one embodiment, the controller 12 automatically obtains control parameters according to control indexes (for example, position deviation, geometric deviation, and/or rotational angle deviation), and controls the machine 10 to perform cutting according to the control parameters. And then, the controller 12 automatically re-adjusts the control parameters according to the cutting result until the accuracy of the cutting result reaches a preset threshold that meets the machining requirements. For example, when smoothness is the priority, the acceleration following deviation is defined as less than 5 micrometers ($\mu$m), the corner deviation is defined as less than 20 micrometers, and the geometric deviation is defined as less than 45 micrometers. When these standards are met, the controller 12 records the control parameters used at this moment as the tuning parameters.

In one embodiment, the tuning parameters include motion control acceleration, control gain, feed forward compensation and other parameters. In addition to the corresponding machining requirements (such as accuracy, surface roughness, speed), it may also consider the dynamic characteristics of the motor characteristics, resonant frequency, dynamic stiffness of the machine structure, damping ratio, and nonlinear factors such as backlash and friction caused by the transmission system.

In step 550, the controller 12 generates a control parameter file according to the tuning parameter. The tuning parameters are included, for example, in the code CD shown in FIG. 2B. In one embodiment, the controller 12 can write the tuning parameters as control parameter files (for example, as shown in FIG. 2B). The control parameter file can be directly applied in the foregoing program integration method 300. The application method has been described in the program integration method 300, so it will not be described here.

Based on above, the machining parameter adjustment system and the machining parameter adjustment method can combine at least one tuning program with a machining program to automatically adjust machining parameters to meet different needs of the production line.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A machining parameter adjustment system, established in a controller, wherein the controller is connected to a machine, wherein
the controller is configured to receive a machining program and analyze at least one process included in the machining program; and
the controller sets a tuning program corresponding to the process and inserts the tuning program before or after the code of the process, so as to generate an integration program and upload the integration program to the machine;
wherein the controller analyses the machining program to obtain a cutting path and analyses the cutting path to generate a path analysis result;
wherein the controller analyses the cutting path to obtain parting allowance information.

2. The machining parameter adjustment system of claim 1, wherein the controller obtains the machining program from computer-aided manufacturing (CAM) software.

3. The machining parameter adjustment system of claim 1, wherein the controller obtains the machining program and a geometric contour parameter from computer-aided manufacturing software, and obtains the path analysis result according to the machining program, determines a machining requirement according to the path analysis result, generates at least one tuning parameter according to the machining requirement and the geometric contour parameter, and generates a control parameter file according to the at least one tuning parameter.

4. The machining parameter adjustment system of claim 3, wherein the control parameter file comprises the code of the tuning program.

5. The machining parameter adjustment system of claim 1, wherein the machining parameter adjustment system is established in an electronic device; and
the electronic device is used to replace the controller.

6. A machining parameter adjustment method, established in a controller, wherein the machining parameter adjustment method comprises:
receiving a machining program and analyzing at least one process included in the machining program;
setting a tuning program corresponding to the process;
inserting the tuning program before or after the code of the process, so as to generate an integration program;
uploading the integration program to a machine;
analyzing the machining program to obtain a cutting path; and
analyzing the cutting path to generate a path analysis result;
wherein in the step of analyzing the cutting path further comprises: obtaining parting allowance information.

7. The machining parameter adjustment method of claim 6, further comprising: obtaining the machining program from computer-aided manufacturing (CAM) software.

8. The machining parameter adjustment method of claim 6, further comprising:
obtaining the machining program and a geometric contour parameter from computer-aided manufacturing software;
obtaining the path analysis result according to the machining program;
determining a machining requirement according to the path analysis result;
generating at least one tuning parameter according to the machining requirement and the geometric contour parameter; and
generating a control parameter file according to the at least one tuning parameter.

9. The machining parameter adjustment method of claim 8, wherein the control parameter file comprises the code of the tuning program.

10. The machining parameter adjustment method of claim 6, wherein the machining parameter adjustment method is performed by an electronic device.

* * * * *